US011553059B2

(12) United States Patent
Sethi et al.

(10) Patent No.: US 11,553,059 B2
(45) Date of Patent: Jan. 10, 2023

(54) USING MACHINE LEARNING TO CUSTOMIZE NOTIFICATIONS FOR USERS

(71) Applicant: Dell Products L.P., Round Rock, TX (US)

(72) Inventors: Parminder Singh Sethi, Ludhiana (IN); Noga Gershon, Dimona (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/065,919

(22) Filed: Oct. 8, 2020

(65) Prior Publication Data
US 2022/0116470 A1 Apr. 14, 2022

(51) Int. Cl.
| | |
|---|---|
| *H04L 67/564* | (2022.01) |
| *G06N 5/00* | (2006.01) |
| *G06N 20/20* | (2019.01) |
| *G06F 9/451* | (2018.01) |
| *H04L 67/50* | (2022.01) |
| *G06F 8/65* | (2018.01) |

(52) U.S. Cl.
CPC .......... *H04L 67/564* (2022.05); *G06F 9/453* (2018.02); *G06N 5/003* (2013.01); *G06N 20/20* (2019.01); *H04L 67/535* (2022.05); *G06F 8/65* (2013.01)

(58) Field of Classification Search
CPC ..... H04L 67/2819; H04L 67/22; G06F 9/453; G06F 8/65; G06N 20/20; G06N 5/003
See application file for complete search history.

(56) References Cited

U.S. PATENT DOCUMENTS

| | | | | |
|---|---|---|---|---|
| 2018/0131655 | A1* | 5/2018 | Carbune | H04L 51/24 |
| 2018/0219807 | A1* | 8/2018 | Thinguldstad | G06N 3/006 |
| 2018/0338010 | A1* | 11/2018 | Llanos Alonso | H04W 4/20 |
| 2018/0367434 | A1* | 12/2018 | Kushmerick | H04L 43/14 |
| 2020/0300664 | A1* | 9/2020 | Zhou | G01F 15/063 |
| 2020/0379735 | A1* | 12/2020 | Sutton | G06F 16/355 |
| 2021/0019135 | A1* | 1/2021 | Hwang | G06F 8/61 |
| 2021/0096933 | A1* | 4/2021 | Tao | G06N 20/00 |

OTHER PUBLICATIONS

J. Shubham, "Ensemble Learning—Bagging and Boosting," https://becominghuman.ai/ensemble-learning-bagging-and-boosting-d20f38be9b1e, Jul. 3, 2018, 8 pages.
J. Rocca, "Ensemble Methods: Bagging, Boosting and Stacking," https://towardsdatascience.com/ensemble-methods-bagging-boosting-and-stacking-c9214a10a205, Apr. 22, 2019, 28 pages.

* cited by examiner

*Primary Examiner* — Joseph L Greene
(74) *Attorney, Agent, or Firm* — Ryan, Mason & Lewis, LLP

(57) ABSTRACT

A method includes extracting data pertaining to a plurality of user actions in connection with one or more changes to one or more of a plurality of applications, and training one or more machine learning models with the extracted data. The one more machine learning models are used to predict whether a user should receive a given notification in connection with a given change to a given application of the plurality of applications. In response to predicting that the user should receive the given notification, content of the given notification is determined. The method further includes generating the given notification for the user, and transmitting the given notification to the user.

20 Claims, 10 Drawing Sheets

| Application | Reason | Bug importance rate | Feature importance rate | User satisfaction rate | Users |
|---|---|---|---|---|---|
| App 1 | Bug fix | 0.3 | 0.05 | 1 | 5154 |
| App 2 | Additional feature | 0.15 | 0.7 | 0 | 2333 |
| App 3 | Security | 0.85 | 0.05 | 1 | 1245 |
| App 4 | Feature upgrade | 0.05 | 0.15 | 1 | 3567 |

```
from sklearn.ensemble import RandomForestClassifier

# Create a model with 200 trees
model = RandomForestClassifier(n_estimators=200, min_samples_leaf=10)
# Fit on training data
model.fit(train, train_labels)
```

```
# Class predictions
rf_predictions = model.predict(test)
```

USING MACHINE LEARNING TO CUSTOMIZE NOTIFICATIONS FOR USERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to collecting user action information and customizing notifications for users based on the collected information.

BACKGROUND

Receiving notifications from device management tools for the results of every application installation or upgrade can be very distracting for users and can affect productivity. Currently, systems are in place which treat all users equally with respect to sending notifications when installations and upgrades for various applications have been successfully completed or have failed. Furthermore, conventional systems also send generic notifications to users, which are not insightful and fail to provide users with valuable information or instructions they may need to address any problems with application installations or upgrades.

Accordingly, there is a need to modify the process for management and issuance of notifications to users made in connection with application changes.

SUMMARY

Illustrative embodiments provide techniques for utilizing machine learning to provide user specific notifications about application status to users. More specifically, the embodiments use machine learning techniques to analyze user behavior and responses to different notifications about application installations and upgrades. Based on the analysis, conclusions are made about what a specific user may need or want from a notification, and future notifications about application activity are tailored for the specific user based on the conclusions.

In one embodiment, a method comprises extracting data pertaining to a plurality of user actions in connection with one or more changes to one or more of a plurality of applications, and training one or more machine learning models with the extracted data. The one more machine learning models are used to predict whether a user should receive a given notification in connection with a given change to a given application of the plurality of applications. In response to predicting that the user should receive the given notification, content of the given notification is determined. The method further includes generating the given notification for the user, and transmitting the given notification to the user.

These and other illustrative embodiments include, without limitation, methods, apparatus, networks, systems and processor-readable storage media.

BRIEF DESCRIPTION OF THE DRAWINGS

FIG. 3 depicts a table corresponding to the use of collected data to calculate different features that can be used to formulate predictions about which notifications to send to a user according to an illustrative embodiment.

FIG. 4 depicts a table corresponding to the identification of similar applications to use when determining notifications to send to particular users based on historical datasets according to an illustrative embodiment.

FIG. 6A depicts example pseudocode for configuring and training a machine learning classifier according to an illustrative embodiment.

FIG. 6B depicts example pseudocode for generating predictions according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
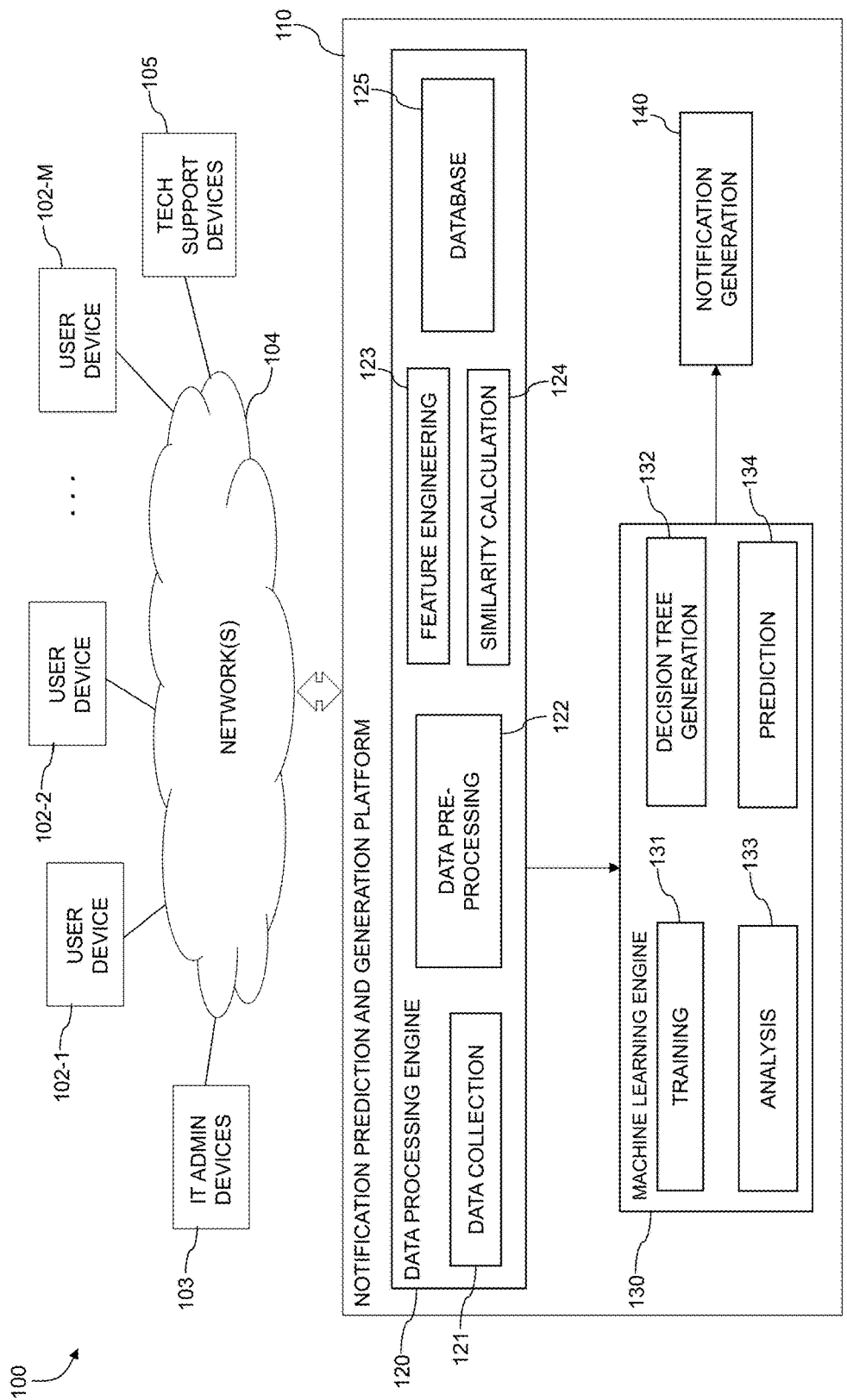
FIG. 1 is a block diagram of an information processing system comprising a notification prediction and generation platform configured for analyzing user actions to make predictions about which notifications to send to users according to an illustrative embodiment.

FIG. 1 shows an information processing system 100 configured in accordance with an illustrative embodiment. The information processing system 100 comprises user devices 102-1, 102-2, . . . 102-M (collectively "user devices 102"), information technology (IT) administrative devices 103 and technical support devices 105. The user devices 102, IT administrative devices 103 and technical support devices 105 communicate over a network 104 with a notification prediction and generation platform 110.

The user devices 102, IT administrative devices 103 and technical support devices 105 can comprise, for example, Internet of Things (IoT) devices, desktop, laptop or tablet computers, mobile telephones, or other types of processing devices capable of communicating with the notification prediction and generation platform 110, and each other over the network 104. Such devices are examples of what are more generally referred to herein as "processing devices." Some of these processing devices are also generally referred to herein as "computers." The user devices 102, IT administrative devices 103 and technical support devices 105 may also or alternately comprise virtualized computing resources, such as virtual machines (VMs), containers, etc. The user devices 102, IT administrative devices 103 and technical support devices 105 in some embodiments comprise respective computers associated with a particular company, organization or other enterprise. The variable M and other similar index variables herein such as K, L and N are assumed to be arbitrary positive integers greater than or equal to two. The user devices 102 may be managed by one or more IT administrators via one or more IT administrative devices 103.

The term "administrator," "client" or "user" herein is intended to be broadly construed so as to encompass numerous arrangements of human, hardware, software or firmware entities, as well as combinations of such entities. Notification prediction and generation services may be provided for administrators utilizing one or more machine learning models, although it is to be appreciated that other types of infrastructure arrangements could be used. At least a portion of the available services and functionalities provided by the notification prediction and generation platform 110 in some embodiments may be provided under Function-as-a-Service ("FaaS") and/or Platform-as-a-Service ("PaaS") models, including cloud-based FaaS and PaaS environments.

Although not explicitly shown in FIG. 1, one or more input-output devices such as keyboards, displays or other types of input-output devices may be used to support one or more user interfaces to the notification prediction and generation platform 110, as well as to support communication between the notification prediction and generation platform 110 and connected devices (e.g., user devices 102, IT administrative devices 103 and/or the technical support devices 105) and/or other related systems and devices not explicitly shown.

In some embodiments, the IT administrative devices 103 and the technical support devices 105 are assumed to be associated with repair technicians, system administrators, IT managers, software developers or other authorized personnel configured to access and utilize the notification prediction and generation platform 110.

The notification prediction and generation platform 110 in the present embodiment is assumed to be accessible to the user devices 102, IT administrative devices 103 and the technical support devices 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The notification prediction and generation platform 110, on behalf of respective infrastructure tenants each corresponding to one or more users associated with respective ones of the user devices 102, utilizes machine learning, including decision trees, to customize the number and content of notifications users receive about application installations and upgrades based on the users' needs and work habits. For example, machine learning models are trained based on historical data to determine user patterns in connection with receipt and processing of notifications about application installations and upgrades. The trained machine learning models are used to predict whether users should receive given notifications at different stages during installation and upgrading of applications. In addition, instead of providing a general notification (e.g., about a failure), the customized notifications include steps that a specific user may need to solve a problem and/or perform an action. Providing this additional information, especially in the case of a frequently used application by the user, can minimize the impact of a failure in connection with that application on the user's ability to work. In addition, providing such guidance to users can reduce the volume of IT tickets that are opened and allow technical support to focus on more urgent matters that require their attention. IT tickets may be opened and technical support may be accessed via, for example, the technical support devices 105.

In an illustrative embodiment, a machine learning model predicts the best actions to take for certain customers. The prediction is based on, for example, actions by each user collected during and after application installations and upgrades, which may be recorded from a point the user receives an installation or upgrade notification until the installation or upgrade is completed or fails. Using the collected data, different features are calculated that can be used to formulate the predictions. Device management applications running on, for example, IT administrative devices 103, can trigger data collection of user activity, and installation and upgrade activity from the user devices 102.

Referring to FIG. 1, the notification prediction and generation platform 110 comprises a data processing engine 120, a machine learning engine 130 and a notification generation engine 140. The data processing engine 120 includes data collection, data pre-processing, feature engineering and similarity calculation components 121, 122, 123 and 124. The data processing engine 120 further includes one or more databases 125. The machine learning engine 130 includes training, decision tree generation, analysis and prediction components 131, 132, 133 and 134. Referring to the system 100 in FIG. 1, according to one or more embodiments, the data collection component 121 of the data processing engine 120 collects data pertaining to user actions in connection with application changes (e.g., installations and/or upgrades) and user responses to notifications received in connection with the application changes. For example, the data collection component 121 collects clickstreams of a user in situations where users receive notifications at various stages during application installation and upgrade processes to determine whether users click on the notifications when they are received on the user device, whether users read the notifications. As used herein, a "click" is to be broadly construed to refer to any affirmative action by a user on a user interface to open or close a window to view or prevent viewing of a notification or other message displayed on a user interface of a user device 102. Depending on the user device 102, the affirmative action may comprise, but is not necessarily limited to, a mouse-click, a keyboard entry, a stylus entry, a touchscreen action (e.g., press or swipe), etc.

The data collection component 121 also collects data about the application changes (e.g., installations and/or upgrades). For example, the data collection component 121 extracts data from the user devices 102 and/or the IT administrative devices 103 about the time it takes for upgrades and/or installations to occur (e.g., from a beginning to an end of the process), and whether the installation and/or upgrade was successful. The data collection component 121 also collects data from technical support devices 105 and/or from user clickstreams about whether and when technical support tickets have been opened and/or technical support has been contacted in response to problems with installations and/or upgrades and/or in response to notifications about problems with installations and/or upgrades.

The data pre-processing component 122 cleans the extracted data by detecting and correcting or removing problematic data, which may be corrupt, inaccurate, incomplete, incorrect or irrelevant. The data pre-processing component 122 also compiles the data from the user devices 102, IT administrative devices 103 and/or technical support devices 105 to generate combined datasets that can be processed by the feature engineering and similarity calculation components 123 and 124, and the machine learning engine 130.

In one or more embodiments, the feature engineering component 123 is used to calculate different features about the collected data that can be used to train the machine learning models that are used by the machine learning engine 130 to formulate the predictions about whether to notify certain users and the content of such notifications.

Referring to the table 300 in FIG. 3, the calculated features include, for example, the average overall installation or upgrade time, the average installation or upgrade time for applications of the same type, a read notifications ratio (read notifications:pushed notifications), click notifications ratio (clicked notifications:pushed notifications), successful upgrade/installation ratio (successful upgrades/installations:total upgrades/installations), technical support to no-click ratio (among all the times a user did not view the notifications, how many times the user contacted technical support), and technical support to click ratio (among all the times the user viewed the notifications, how many times the user contacted technical support). In more detail, the click notifications ratio is a ratio of a number of notifications clicked on by a user to a number of the notifications received by (or pushed to) the user in connection with respective installations and/or upgrades. For example, a user might have received 25 notifications and out of these 25 notifications, the user just clicked on 5. In this case, the click notifications ratio is 5/25, or 1/5. The read notifications ratio is a ratio of a number of notifications read by a user to a number of the notifications received by the user in connection with respective installations and/or upgrades. The technical support to no-click ratio is a ratio of a number of times a user contacted technical support to a number of times the user failed to read a corresponding notification in connection with respective installations and/or upgrades, and technical support to click ratio is a ratio of a number of times a user contacted technical support to a number of times the user read a corresponding notification in connection with respective installations and/or upgrades. The successful upgrade/installation ratio is a ratio of a number of successful application upgrades to a total number of attempted application upgrades, or a ratio of a number of successful application installations to a total number of attempted application installations.

Referring to the table 300, according to an embodiment, the collected data is categorized according to user, application and type of upgrade (or installation). The table 300 also includes a conclusion about whether that user should be notified about that particular upgrade/installation type (1=notify, 0=do not notify). This conclusion is based on application of the data to the machine learning engine 130, discussed further herein.

Figure 4:
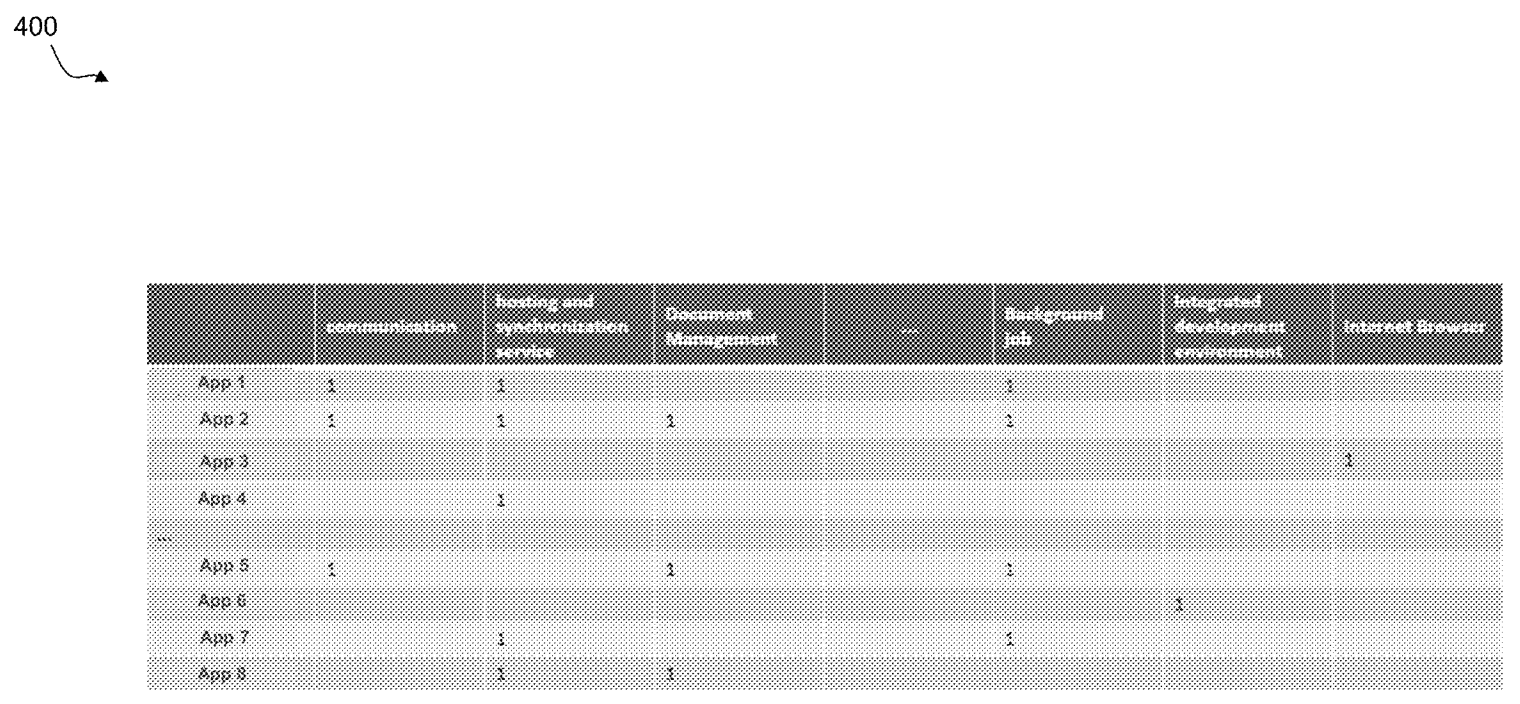

Referring to FIGS. 1 and 4, the collected data also includes data about the characteristics of different applications that may be running on the user devices, which is used by the similarity calculation component 124 to identify two or more of applications that are similar to each other based on the characteristics. According to an embodiment, the features engineering component 123 determines the characteristics of the various applications and tags and/or classifies the characteristics into different categories representing the capabilities of the applications, such as, but not necessarily limited to, communication, hosting and synchronization services, document management, background jobs, integrated development environments, and Internet browsing.

The table 400 illustrates different applications APP 1-APP 8, and their characteristics. Using, for example, cosine similarity (or other comparison methodology), the similarity calculation component identifies the similar applications to a given application that can be used when predicting which notifications to send a user in connection with the given application. In an operational example, referring to FIG. 4, a user had APP 1 installed on their user device 102 and multiple instances of user actions in connection with APP 1 were collected over an extended period of time (e.g., years, months, weeks). When a new application (e.g., APP 5) is installed, there is no historical data for APP 5 on which to base a prediction of which notifications to send to the user in connection with APP 5. Using the characteristics on table 400, the similarity between existing applications and new applications can be calculated so that a similar existing application (e.g., APP 1) and its user notification history can be used as a basis to predict which notifications to send to a user for the new application (e.g., APP 5).

Figure 5:
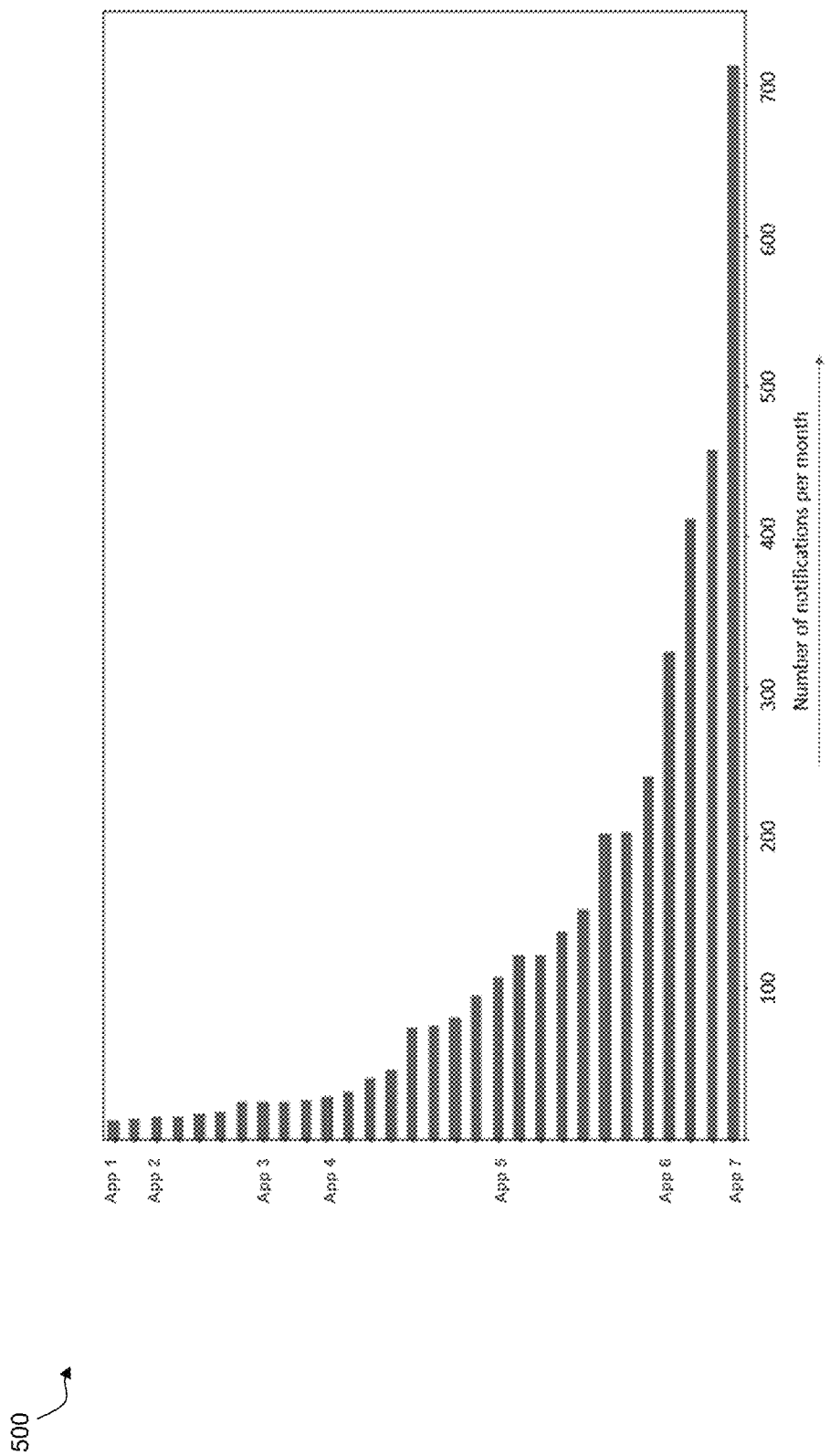
FIG. 5 depicts a graph showing the number of notifications per month for different applications according to an illustrative embodiment.

Referring to FIG. 5, the collected data 500 also includes data corresponding to the total number of notifications provided to a user for each application (e.g., APPS 1-7) over a given period of time (e.g., per month). The collected data and the calculated features may be stored in one or more databases 125.

The collected data and the calculated features from the data processing engine 120 are input to the machine learning engine 130. The machine learning engine 130 uses one or more machine learning models to predict whether a user should receive a given notification in connection with a given change to a given application. In response to predicting that the user should receive the given notification, the machine learning engine 130 is also configured to customize content of the given notification for the user. According to one or more embodiments, a machine learning model comprises a random forest classifier, which is an ensemble bagging algorithm. The random forest classifier uses multiple decision trees to provide predictions with a high degree of accuracy based of different amounts and types of training data. A training component 131 uses data from the data processing engine 120 comprising, for example, average overall application installation or upgrade time, average application installation or upgrade time for applications of the same type, read notifications ratios, click notifications ratios, successful upgrade/installation ratios, technical support to no-click ratios, technical support to click ratios and applications identified to be similar to train the machine learning model. The machine learning model comprises a plurality of decision trees, and the plurality of decision trees are respectively trained with different portions of the extracted data.

Figure 7:
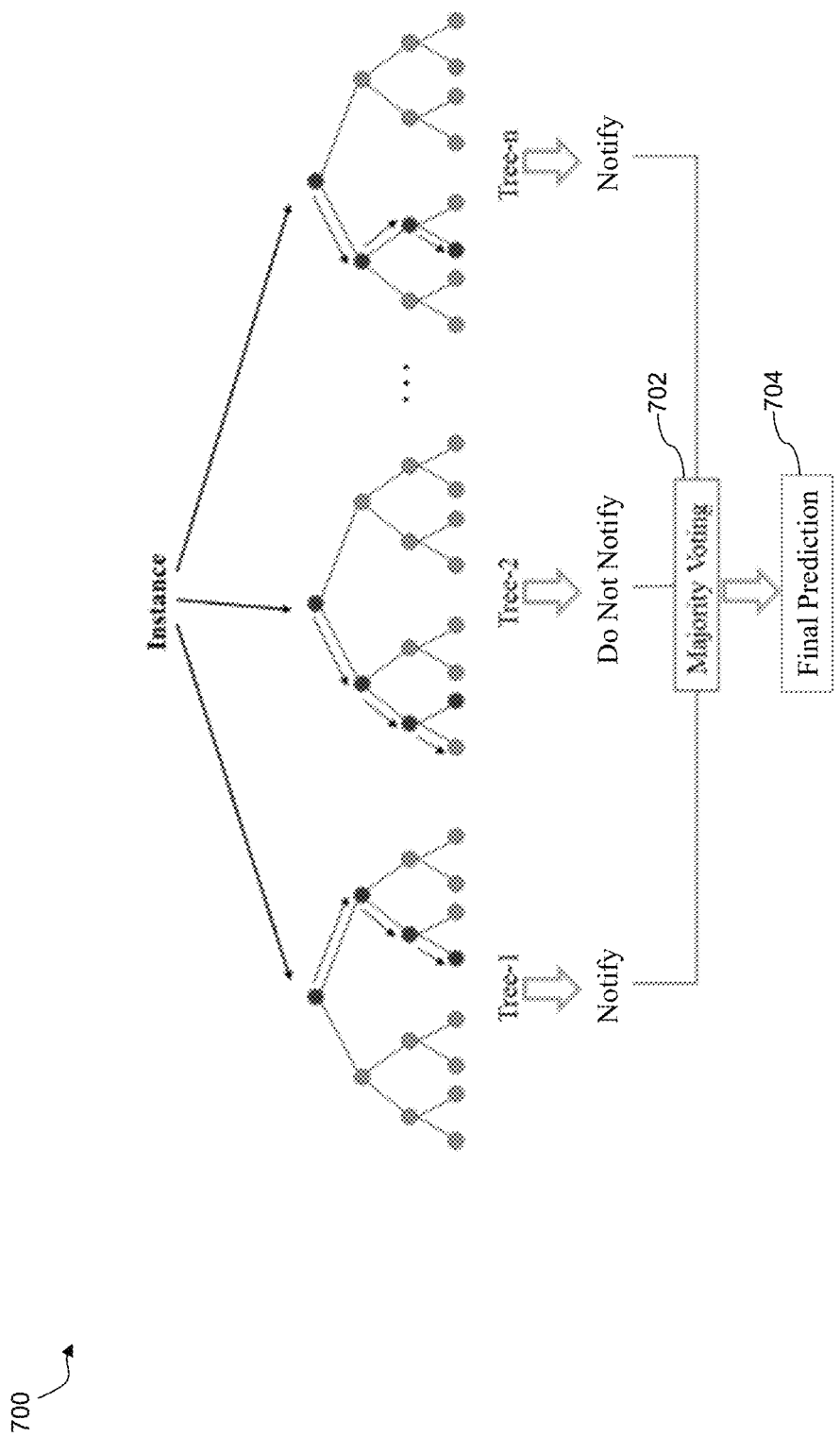
FIG. 7 depicts a plurality of decision trees used in connection with a random forest classifier according to an illustrative embodiment.

For example, referring to the random forest classifier diagram 700 in FIG. 7, using the decision tree generation component 132, each decision tree of a plurality of decision trees Tree-1, Tree-2, . . . Tree-N, is constructed using different features and different data samples, which reduces the bias and variance. In the training process, the decision trees Tree-1, Tree-2, . . . Tree-n are constructed using the training data, which comprises historical user behavior data, installation/upgrade data and application similarity data. Using the analysis and prediction components 133 and 134, in the testing process, data ("Instance" in FIG. 7) comprising, for example, user information, application type and characteristics, installation or upgrade type, stage of installation or upgrade, and notification type and purpose, is inputted to the multiple decision trees Tree-1, Tree-2, . . . Tree-N to generate a prediction whether a notification should be issued for a given user. Based on the inputted data, each decision tree Tree-1, Tree-2, . . . Tree-N yields a score indicative of whether a notification should be issued for a particular user in the given set of circumstances. The final prediction 704 is determined based on whether the majority of decision trees indicate that the notification should be issued or should not be issued. For example, in the diagram 700 of FIG. 7, the majority of decision trees provide a score (e.g. over a certain threshold) which requires issuing a notification, such that through majority voting 702, the final prediction 704 for this particular set of circumstances (Instance) is to notify the user. Random forest classification is based on the wisdom of a plurality of models. Instead of using just one model (e.g., decision tree) to make a prediction, a random forest technique uses multiple uncorrelated decision trees, which outperforms the methodology when using single tree. The use of multiple decision trees minimizes errors, when compared with using a single decision tree. In this model, even if some trees might yield an incorrect result, the majority of decision trees will produce a correct result.

According to the embodiments, the random forest algorithm can be used for classification and regression tasks, and can handle multiple features such as, for example, binary, categorical and numerical features. In addition, the random forest model eliminates the need to rescale or transform data, and works well with high dimensional data. Advantageously, the random forest model allows for higher training speed and quicker prediction generation than previous methods. The random forest techniques used herein are also robust to outliers and non-linear data, and handle unbalanced data well.

FIG. 6A depicts example pseudocode 605 for configuring and training a machine learning classifier, and FIG. 6B depicts example pseudocode 610 for generating predictions according to illustrative embodiments. The pseudocode 605 indicates that a random forest machine learning model is created with 200 decision trees, each having a minimum of 10 leaves. A RandomForestClassifier category of the sklearn.ensemble library resolves a regression issue. The quantity of trees in the random forest is defined by using n_estimator=200. This parameter provides insight regarding how the algorithmic rule performs.

The pseudocode 610 indicates generating class predictions using the random forest model. To generate predictions, the random forest model utilizes bootstrap aggregating to generate predictions, which includes using multiple classifiers (which can be done in parallel), each trained on different data samples and different features. This reduces the variance and the bias stem from using a single classifier. The final classification is achieved by aggregating the predictions that were made by the different classifiers.

In response to predicting that a user should receive a given notification, the machine learning engine 130 further predicts what content to include in the notification based on the historical data for the users and how they reacted to previous notifications, as well as user reactions to similar notifications for the same or similar applications. For example, if a user read a similar previous notification and contacted technical support in a similar set of circumstances, the machine learning engine 130 may recommend a more comprehensive notification having more detail about how to fix an issue. Based on the output from the machine learning engine, the notification generation engine 140 generates a customized notification for a user, and the notification prediction and generation platform 110 transmits the notification to the user via, for example, one of the user devices 102.

Figure 2:
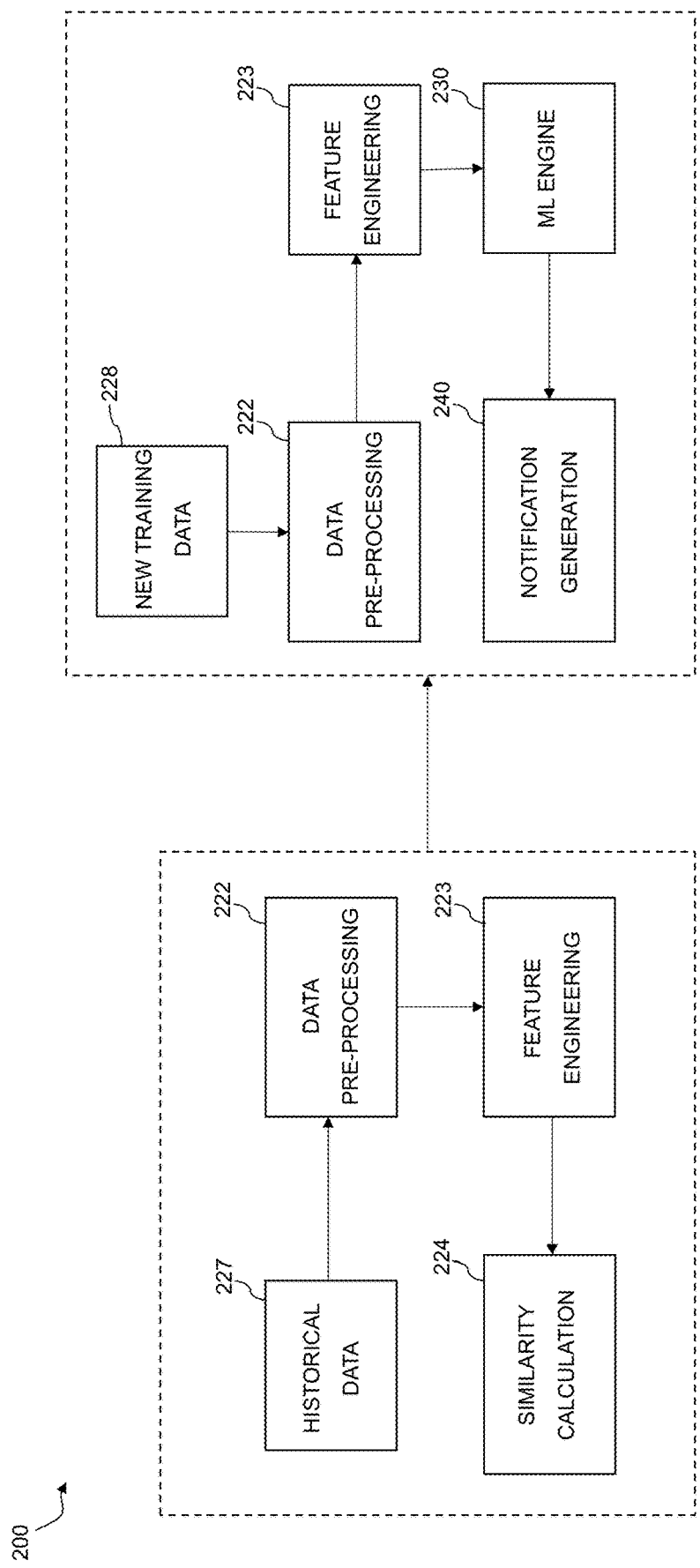
FIG. 2 depicts operational flow details in connection with determining similarities between applications and generating real-time notifications according to an illustrative embodiment.

Referring to FIG. 2, an operational flow 200 depicts details in connection with determining similarities between applications and generating real-time notifications according to an illustrative embodiment. Similar to what is described in connection with FIG. 1, historical data 227 comprising, for example, data about the characteristics of different applications that may be running on the user devices, is used by a similarity calculation component 224 (like the similarity calculation component 124) to identify two or more of applications that are similar to each other based on the characteristics. Similar to the data pre-processing component 122 in FIG. 1, a data pre-processing component 222 prepares the collected data for processing by the features engineering component 223, which determines the characteristics of the various applications and tags and/or classifies the characteristics into different categories representing the functionalities of the applications. Using, for example, cosine similarity (or other comparison methodology), the similarity calculation component 224 identifies the similar applications to a given application that can be used when predicting which notifications to send a user in connection with the given application.

In addition, as can be seen in FIG. 2, the machine learning engine 230, like the machine learning engine 130 in FIG. 1, periodically receives new training data 228 based on recent user activity and recent responses to received notifications. For example, the new training data 228 comprises user behavior data similar to that described in connection with FIG. 3, and is provided to the machine learning engine 230 to periodically retrain the machine learning engine 230 over short periods of time (e.g., every couple of weeks) so that the machine learning engine 230 (or 130) is equipped to generate predictions in real-time from a pre-trained model that has been consistently retrained. The training data 228 is similarly processed through data pre-processing and feature engineering components 222 and 223. The notification generation engine 240, like the notification generation engine 140 in FIG. 1, generates notifications to be sent to a user based on the output from a machine learning engine 230.

The database 125 in some embodiments is implemented using one or more storage systems or devices associated with the notification prediction and generation platform 110. In some embodiments, one or more of the storage systems utilized to implement the database 125 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

At least portions of the notification prediction and generation platform 110 and the components thereof may be implemented at least in part in the form of software that is stored in memory and executed by a processor. The notification prediction and generation platform 110 and the components thereof comprise further hardware and software required for running the notification prediction and generation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data processing engine 120, machine learning engine 130, notification generation engine 140 and other components of the notification prediction and generation platform 110 in the present embodiment are shown as part of the notification prediction and generation platform 110, at least a portion of the data processing engine 120, machine learning engine 130, notification generation engine 140 and other components of the notification prediction and generation platform 110 in other embodiments may be implemented on one or more other processing platforms that are accessible to the notification prediction and generation platform 110 over one or more networks. Such components can each be implemented at least in part within another system element or at least in part utilizing one or more stand-alone components coupled to the network 104.

It is assumed that the notification prediction and generation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data processing engine 120, machine learning engine 130, notification generation engine 140 and other components of the notification prediction and generation platform 110, and the elements thereof can each be implemented in the form of one or more LXCs running on one or more VMs. Other arrangements of one or more processing devices of a processing platform can be used to implement the data processing engine 120, machine learning engine 130 and notification generation engine 140, as well as other components of the notification prediction and generation platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the notification prediction and generation platform 110 to reside in different data centers. Numerous other distributed implementations of the notification prediction and generation platform 110 are possible.

Accordingly, one or each of the data processing engine 120, machine learning engine 130, notification generation engine 140 and other components of the notification prediction and generation platform 110 can each be implemented in a distributed manner so as to comprise a plurality of distributed components implemented on respective ones of a plurality of compute nodes of the notification prediction and generation platform 110.

It is to be appreciated that these and other features of illustrative embodiments are presented by way of example only, and should not be construed as limiting in any way.

Accordingly, different numbers, types and arrangements of system components such as the data processing engine 120, machine learning engine 130, notification generation engine 140 and other components of the notification prediction and generation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the notification prediction and generation platform 110 can be offered to cloud infrastructure customers or other users as part of FaaS and/or PaaS offerings.

Figure 8:
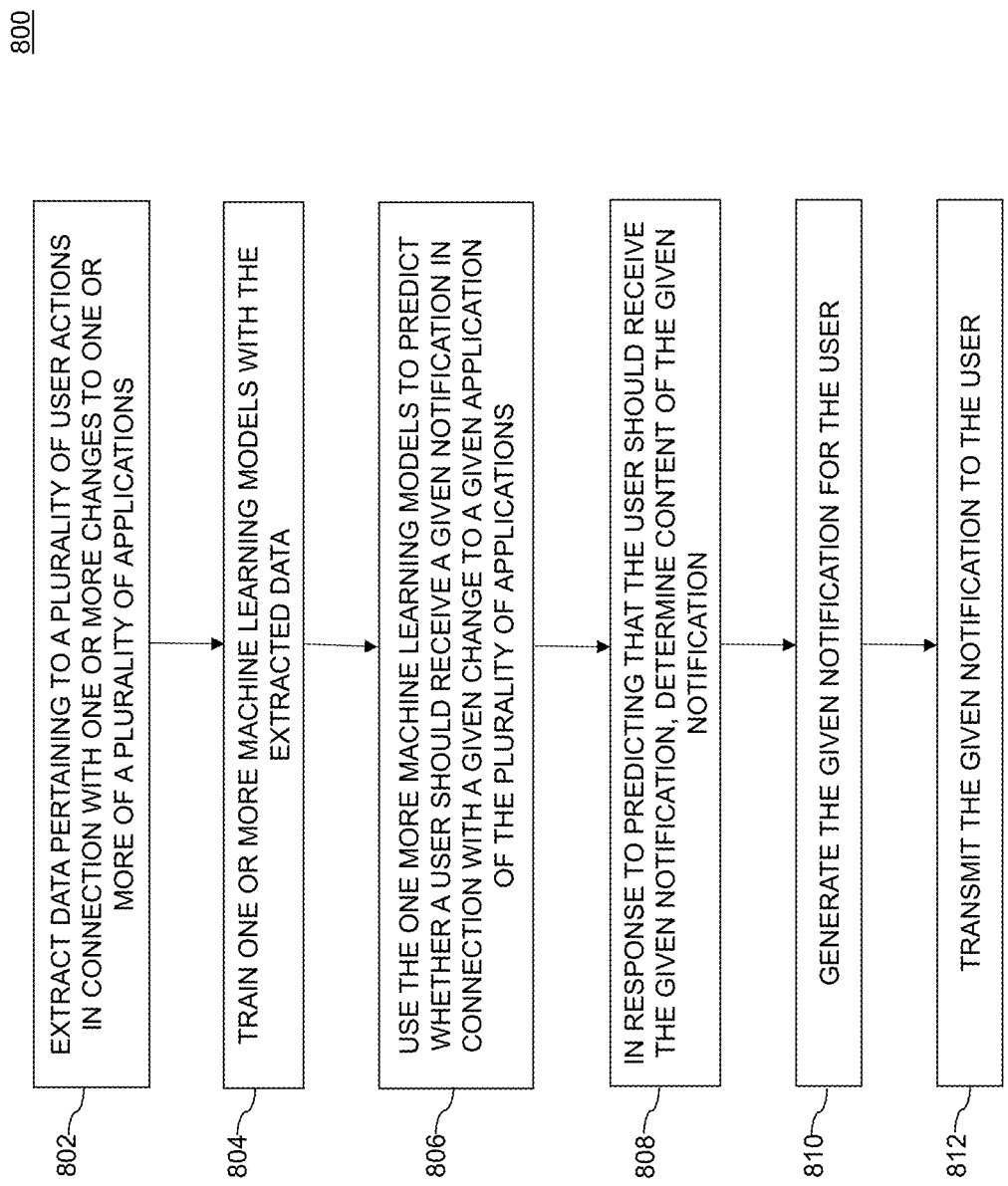
FIG. 8 is a flow diagram of an exemplary process for analyzing user actions to make predictions about which notifications to send to users according to an illustrative embodiment.

The operation of the information processing system 100 will now be described in further detail with reference to the flow diagram of FIG. 8. With reference to FIG. 8, a process 800 for analyzing user actions to make predictions about which notifications to send to users as shown includes steps 802 through 812, and is suitable for use in the system 100 but is more generally applicable to other types of information processing systems comprising a notification prediction and generation platform configured for analyzing user actions to make predictions about which notifications to send to users.

In step 802, data pertaining to a plurality of user actions in connection with one or more changes to one or more of a plurality of applications is extracted. The one or more changes comprise an installation of and/or an upgrade to the one or more of the plurality of applications. Extracting the data comprises collecting one or more clickstreams of the user.

In step 804, one or more machine learning models are trained with the extracted data. The one or more machine learning models comprise a plurality of decision trees, and the plurality of decision trees are respectively trained with different portions of the extracted data. According to an embodiment, each of the plurality of decision trees yields a positive result or a negative result with respect to whether the user should receive the given notification, and the prediction whether the user should receive the given notification corresponds to the result produced by a majority of the plurality of decision trees.

In step 806, the one more machine learning models are used to predict whether a user should receive a given notification in connection with a given change to a given application of the plurality of applications. The prediction whether the user should receive the given notification is based at least in part on data pertaining to one or more user actions in connection with one or more of the plurality of applications identified as similar to the given application.

In step 808, in response to predicting that the user should receive the given notification, content of the given notification is determined. In step 810, the given notification for the user is generated, and, in step 812, the given notification is transmitted to the user.

According to one or more embodiments, extracting the data further comprises: (i) calculating a ratio of a number of notifications read by the user to a number of the notifications received by the user in connection with respective ones of the one or more changes; (ii) calculating a ratio of a number of times the user contacted technical support to a number of times the user failed to read a corresponding notification in connection with respective ones of the one or more changes; and/or (iii) calculating a ratio of a number of times the user contacted technical support to a number of times the user read a corresponding notification in connection with respective ones of the one or more changes.

The process may further comprise extracting data about the one or more changes to the one or more of a plurality of applications, and training the one or more machine learning models with the extracted data about the one or more changes.

Extracting the data about the one or more changes comprises: (i) calculating an overall average installation time and/or an overall average upgrade time for the plurality of applications; and/or (ii) calculating an average installation time and/or an average upgrade time for one or more subsets of the plurality of applications determined to have the same application type.

Extracting the data about the one or more changes may also comprise: (i) calculating a ratio of a number of successful application upgrades to a total number of attempted application upgrades; and/or (ii) calculating a ratio of a number of successful application installations to a total number of attempted application installations.

The process may further comprise determining one or more characteristics of respective ones of the plurality of applications, and identifying, using cosine similarity, two or more of the plurality of applications that are similar to each other based on the determined one or more characteristics.

It is to be appreciated that the FIG. 8 process and other features and functionality described above can be adapted for use with other types of information systems configured to execute notification prediction and generation services on a notification prediction and generation platform or other type of processing platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with the notification prediction and generation platform as disclosed herein can provide a number of significant advantages relative to conventional arrangements. For example, one or more embodiments are configured to provide tailor-made notifications to users in connection with the success or failure of application installations or upgrades. The notifications will be based on how the applications are used by the users, the type of installation or upgrade, and historical user behavior corresponding to how users had reacted to different notifications and their content.

Current techniques send the same generic notifications to all users, treating each user and the applications the same. This results in users receiving unwanted notifications for every installation or upgrade success or failure, which undesirably distracts users and adversely affects their productivity. In order to minimize the number of notifications, while preserving a well-functioning work environment, the embodiments advantageously rely on machine learning techniques to customize the notifications users receive based on an analysis of their behavior in connection with previously received notifications for similar applications. The embodiments further use historical technical support data to define the content of the notifications to provide steps that the user can follow to efficiently solve a problem with an application instead of having to contact technical support. Such content customization reduces work stoppages, especially when provided in connection with frequently used applications, and allows technical support applications to focus computational resources in areas of more urgent need.

Advantageously, the embodiments customize the number and content of notifications users receive about application installations and upgrades based on the users' needs and work habits. For example, in an illustrative embodiment, a machine learning model predicts the number and content of notifications based on, for example, user actions made in connection with application installations and upgrades and calculated features including, but not necessarily limited to, read notifications ratios, click notifications ratios, successful upgrade/installation ratios, technical support to no-click ratios and technical support to click ratios.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the notification prediction and generation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a notification prediction and generation platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
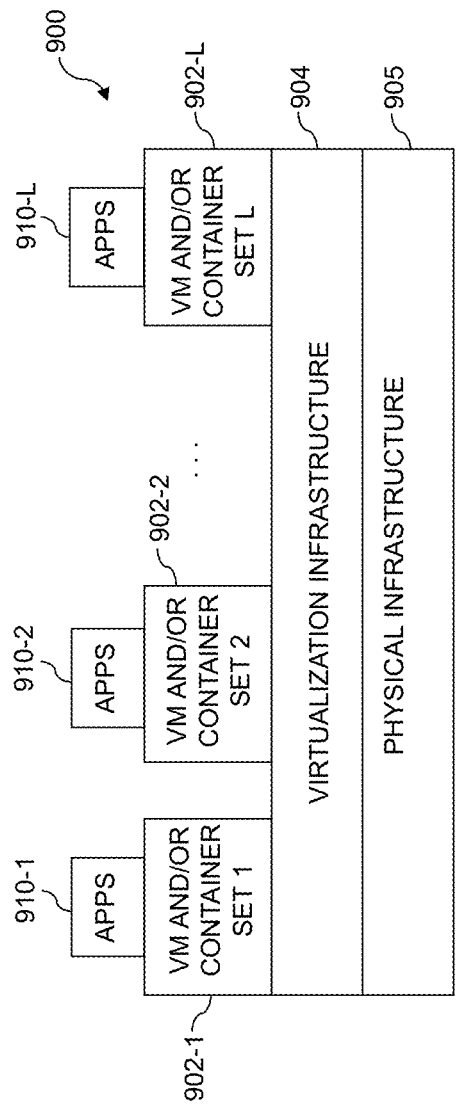
FIGS. 9 and 10 show examples of processing platforms that may be utilized to implement at least a portion of an information processing system according to illustrative embodiments.
Figure 10:
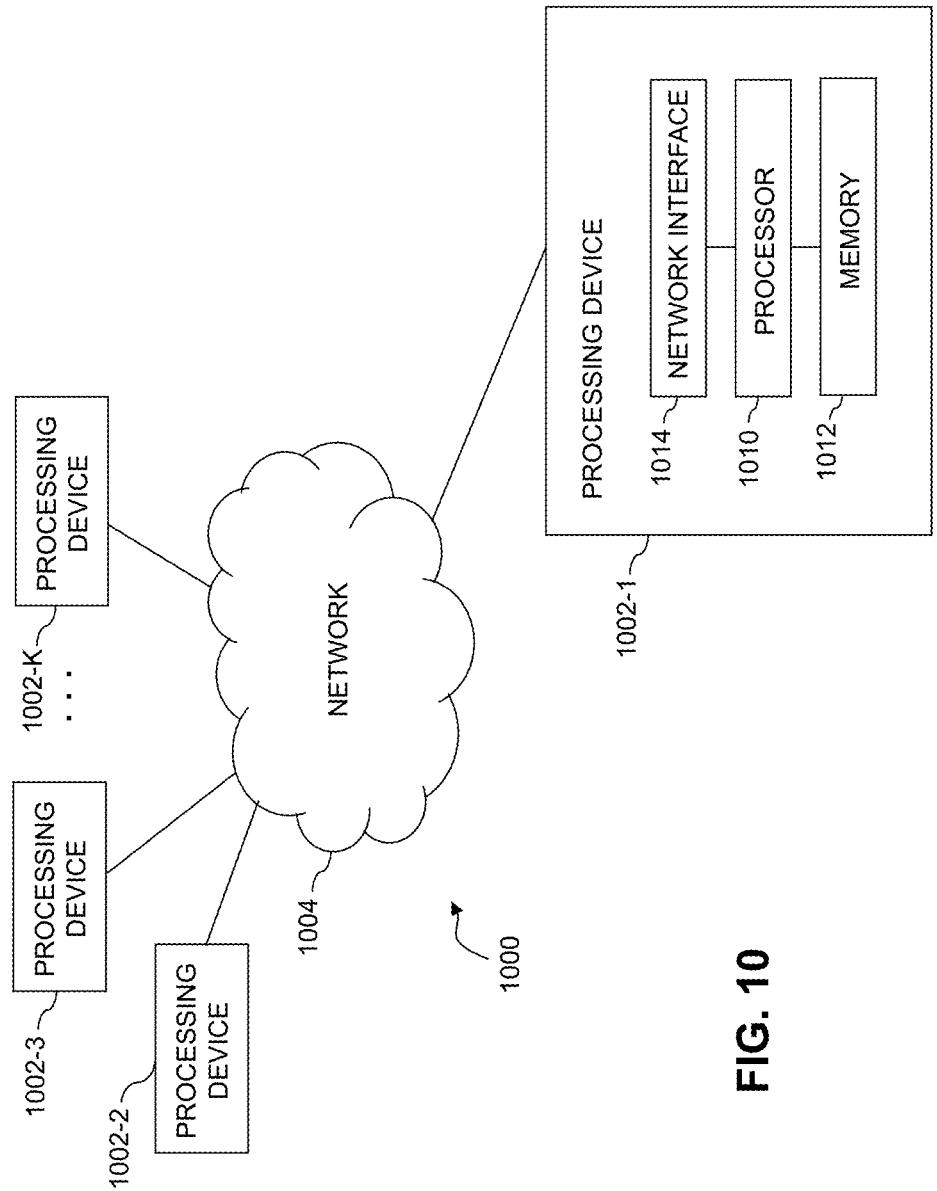

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the notification prediction and generation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and notification prediction and generation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    extracting data pertaining to a plurality of user actions in connection with one or more changes to one or more of a plurality of applications;
    training one or more machine learning models with the extracted data;
    using the one more machine learning models to predict whether a user should receive a given notification in connection with a given change to a given application of the plurality of applications;
    in response to predicting that the user should receive the given notification, determining, using the one or more machine learning models, content of the given notification;
    generating the given notification for the user; and
    transmitting the given notification to the user;
    wherein the determining of the content of the given notification comprises:
    identifying one or more notifications received by the user as being at least similar to the given notification;
    determining that the one or more notifications received by the user resulted in one or more support requests; and
    including one or more details in the given notification to address one or more issues with the given change to the given application responsive to the determination that the one or more notifications received by the user resulted in the one or more support requests;
    wherein extracting the data comprises calculating a ratio of a number of times the user contacted technical support to a number associated with a read status of the user with respect to a corresponding notification in connection with respective ones of the one or more changes;
    wherein the number associated with the read status of the user comprises one of a number of times the user failed to read and a number of times the user read a corresponding notification in connection with respective ones of the one or more changes; and
    wherein the steps of the method are executed by a processing device operatively coupled to a memory.

2. The method of claim 1, wherein the one or more changes to the one or more of the plurality of applications comprise at least one of an installation of and an upgrade to the one or more of the plurality of applications.

3. The method of claim 1, wherein extracting the data further comprises collecting one or more clickstreams of the user.

4. The method of claim 1, wherein extracting the data further comprises calculating a ratio of a number of notifications read by the user to a number of notifications received by the user in connection with respective ones of the one or more changes.

5. The method of claim 2, further comprising:
extracting data about the one or more changes to the one or more of a plurality of applications; and
training the one or more machine learning models with the extracted data about the one or more changes.

6. The method of claim 5, wherein extracting the data about the one or more changes comprises calculating at least one of an overall average installation time and an overall average upgrade time for the plurality of applications.

7. The method of claim 5, wherein extracting the data about the one or more changes comprises calculating at least one of an average installation time and an average upgrade time for one or more subsets of the plurality of applications determined to have the same application type.

8. The method of claim 5, wherein extracting the data about the one or more changes comprises calculating at least one of: (i) a ratio of a number of successful application upgrades to a total number of attempted application upgrades; and (ii) a ratio of a number of successful application installations to a total number of attempted application installations.

9. The method of claim 1, further comprising:
determining one or more characteristics of respective ones of the plurality of applications; and
identifying, using cosine similarity, two or more of the plurality of applications that are similar to each other based on the determined one or more characteristics.

10. The method of claim 9, wherein the prediction whether the user should receive the given notification in connection with the given change to the given application is based at least in part on data pertaining to one or more user actions in connection with one or more of the plurality of applications identified as similar to the given application.

11. The method of claim 1, wherein the one or more machine learning models comprise a plurality of decision trees, and the plurality of decision trees are respectively trained with different portions of the extracted data.

12. The method according to claim 11, wherein:
each of the plurality of decision trees yields one of a positive result and a negative result with respect to whether the user should receive the given notification; and
the prediction whether the user should receive the given notification corresponds to the result produced by a majority of the plurality of decision trees.

13. An apparatus comprising: a processing device operatively coupled to a memory and configured to: extract data pertaining to a plurality of user actions in connection with one or more changes to one or more of a plurality of applications; train one or more machine learning models with the extracted data; use the one more machine learning models to predict whether a user should receive a given notification in connection with a given change to a given application of the plurality of applications; in response to predicting that the user should receive the given notification, determine, using the one or more machine learning models, content of the given notification; generate the given notification for the user; and transmit the given notification to the user; wherein, in determining the content of the given notification, the processing device is configured to: identify one or more notifications received by the user as being at least similar to the given notification; determine that the one or more notifications received by the user resulted in one or more support requests; and include one or more details in the given notification to address one or more issues with the given change to the given application responsive to the determination that the one or more notifications received by the user resulted in the one or more support requests; wherein, in extracting the data, the processing device is configured to calculate a ratio of a number of times the user contacted technical support to a number associated with a read status of the user with respect to a corresponding notification in connection with respective ones of the one or more changes; and wherein the number associated with the read status of the user comprises one of a number of times the user failed to read and a number of times the user read a corresponding notification in connection with respective ones of the one or more changes.

14. The apparatus of claim 13, wherein the one or more changes to the one or more of the plurality of applications comprise at least one of an installation of and an upgrade to the one or more of the plurality of applications.

15. The apparatus of claim 13, wherein the processing device is further configured to:
determine one or more characteristics of respective ones of the plurality of applications; and
identify, using cosine similarity, two or more of the plurality of applications that are similar to each other based on the determined one or more characteristics.

16. The apparatus of claim 15, wherein the prediction whether the user should receive the given notification in connection with the given change to the given application is based at least in part on data pertaining to one or more user actions in connection with one or more of the plurality of applications identified as similar to the given application.

17. An article of manufacture comprising a non-transitory processor-readable storage medium having stored therein program code of one or more software programs, wherein the program code when executed by at least one processing device causes said at least one processing device to perform the steps of: extracting data pertaining to a plurality of user actions in connection with one or more changes to one or more of a plurality of applications; training one or more machine learning models with the extracted data; using the one more machine learning models to predict whether a user should receive a given notification in connection with a given change to a given application of the plurality of applications; in response to predicting that the user should receive the given notification, determining, using the one or more machine learning models, content of the given notification; generating the given notification for the user; and transmitting the given notification to the user; wherein, in determining the content of the given notification, the program code causes said at least one processing device to perform the steps of: identifying one or more notifications received by the user as being at least similar to the given notification; determining that the one or more notifications received by the user resulted in one or more support requests; and including one or more details in the given notification to address one or more issues with the given change to the given application responsive to the determination that the one or more notifications received by the user resulted in the one or more support requests; wherein, in extracting the data, the program code causes said at least one processing device to calculate a ratio of a number of times the user contacted technical support to a number associated with a read status of the user with respect to a corresponding notification in connection with respective ones of the one or more changes; and wherein the number associated with the read status of the user comprises one of a number of times the user failed to read and a number of times the user read a corresponding notification in connection with respective ones of the one or more changes.

18. The article of manufacture of claim 17, the one or more changes to the one or more of the plurality of applications comprise at least one of an installation of and an upgrade to the one or more of the plurality of applications.

19. The article of manufacture of claim 17, wherein the program code further causes said at least one processing device to perform the steps of: determining one or more characteristics of respective ones of the plurality of applications; and identifying, using cosine similarity, two or more of the plurality of applications that are similar to each other based on the determined one or more characteristics.

20. The article of manufacture of claim 19, wherein the prediction whether the user should receive the given notification in connection with the given change to the given application is based at least in part on data pertaining to one or more user actions in connection with one or more of the plurality of applications identified as similar to the given application.

\* \* \* \* \*